United States Patent Office 2,821,868
Patented Feb. 4, 1958

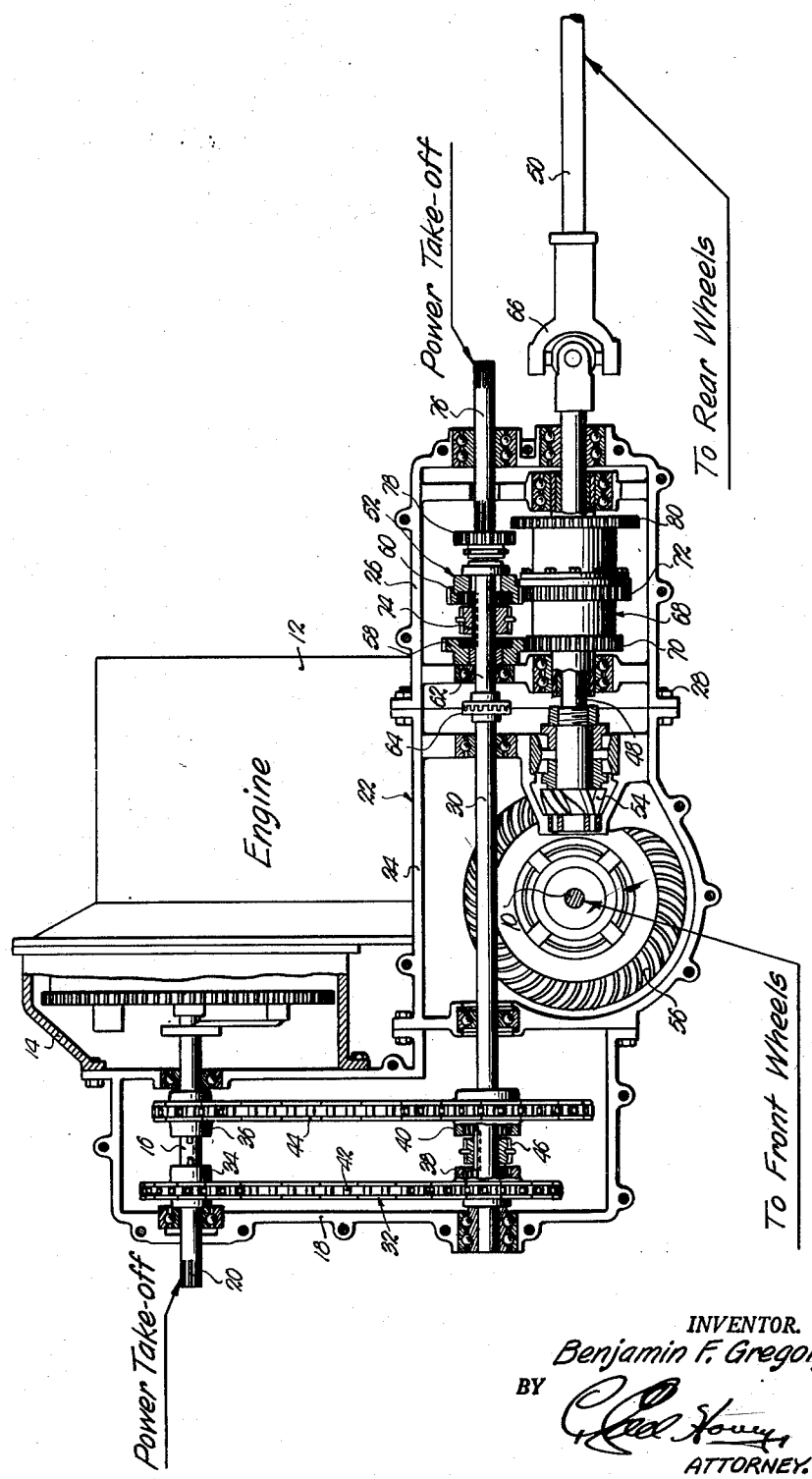

2,821,868

POWER TRANSMISSION ASSEMBLY

Benjamin F. Gregory, Kansas City, Mo.

Application June 22, 1953, Serial No. 363,097

10 Claims. (Cl. 74—701)

This invention relates to improvements in power transmissions for mobile vehicles and particularly automotive equipment, the primary object being to provide a multi-speed power transmitting arrangement requiring a minimum amount of engine power and of reduced weight, as well as number of parts to thereby diminish the cost and increase the overall efficiency.

It is the most important object of the present invention to provide a power transmission adapted for disposition in close proximity to the engine with which it is operably coupled, and next adjacent the front wheel and axle assembly of the vehicle, all to the end that a relatively short, powerful and efficiently operating coupling arrangement may be made between the engine and the transmission as well as between the latter and the wheel and axle assemblies of the automobile.

Other objects include the way in which variable speed structure is provided in the power transmission hereof forwardly of the prime mover; the way in which variable speed apparatus disposed rearwardly and below the engine is operably coupled with the wheel and axle assemblies; the manner of interconnecting the variable speed structure and the variable speed apparatus through the provision of a driven shaft that underlies the engine above the front axle; the manner of providing a differential within and as a part of the aforementioned apparatus; and many more minor objects all of which will be made clear as the following specification progresses.

The single figure of the drawing is a fragmentary view of an automotive vehicle showing the power transmission assembly hereof in section and operably coupled with the prime mover, as well as the front axle.

The power transmission about to be described, has been designed for particular adaptation to automotive vehicles wherein it is desired that the overall length of the unit be relatively short, while not sacrificing for power, lightness, maneuverability and ease of operation. Vehicles of this type are in great demand by the armed services and, as will hereinafter appear, the present invention provides for a wide speed differential, thereby rendering the vehicle adaptable for high speeds where required and also for an extreme amount of power for use under varying conditions.

The vehicle is provided with a front and rear wheel and axle assembly, the front axle only being illustrated in the drawing and designated by the numeral 10. A prime mover, broadly designated by the numeral 12, directly overlies the horizontal axle 10. The prime mover 12 is provided with clutch means within housing portion 14 at the front thereof in the usual manner for operably connecting the same with a forwardly extending, horizontal drive shaft 16 extending through a casing portion 18 to provide a power take-off end 20.

A transmission housing broadly designated by the numeral 22, underlying the prime mover 12 and connected with the casing portion 18, is composed on a pair of sections 24 and 26 releasably interconnected as at 28.

An elongated driven shaft 30 in parallelism with the drive shaft 16 and disposed therebelow, overlies the axle 10 beneath prime mover 12, and is journaled for rotation within the casing portion 18 and the housing section 24.

Structure operably interconnecting the shafts 16 and 30 and disposed within the casing portion 18, is broadly designated by the numeral 32 and includes a pair of elements on each of the shafts 16 and 30 respectively. The elements on the shaft 16 consist of a pair of sprocket wheels 34 and 36 rigid to the shaft 16 for rotation therewith, and a pair of sprocket wheels 38 and 40 rotatable on the shaft 30. Continuous flexible bands interconnect these elements and consist of a chain 42 trained around the elements 34 and 38 and a chain 44 trained around sprocket wheels 36 and 40.

Either chain 42 or 44 may be placed in operation to interconnect shafts 16 and 30 by the provision of clutch means that includes a reciprocable clutch device 46 slidable on the shaft 30 but held against rotation with respect thereto. Any suitable operable control accessible to the operator within the body of the vehicle (not shown) may be connected to the clutch coupling 46 for shifting the latter into locking engagement with either the sprocket wheel 38 or the sprocket wheel 40. The diameters of the four sprocket wheels 34, 36, 38 and 40 may be chosen at the discretion of the manufacturer to provide a differential in speed so as to present a high and a low range in the structure 32.

Apparatus for operably coupling shaft 30 with an input shaft 48 and a rear wheel and axle shaft 50, is mounted within the housing section 26 and broadly designated by the numeral 52. The input shaft 48 is journaled within the housing section 24 and means operably joining the same with the front axle 10, includes a pinion 54 on the shaft 48 in mesh with a ring gear 56 operably connected to the shaft 10.

Apparatus 52 consists of a pair of interconnecting mechanisms, each of which includes a pair of members in the nature of gears 58 and 60 rotatable on the shaft 30, or more particularly, upon a shaft section 62 that connects with the shaft 30 through a releasable coupling 64. Thus, upon release of the interconnection 28, the housing section 26 may be freed from the section 24, and the apparatus 52 easily and quickly disconnected from shafts 30 and 48 upon disassembly of a universal coupling 66 within the shaft 50. In this respect it is pointed out that a differential 68, forming a part of the apparatus 52, is adapted to slide freely from its operable connection with the shaft 48.

The differential 68 has a pair of members in the nature of gears 70 and 72 in constant mesh with gears 58 and 60 respectively, to the end that when either of the last-mentioned gears is connected to the shaft section 62, shafts 48 and 50 will be simultaneously rotated to drive both the front and rear wheel axle assemblies.

A clutching arrangement is provided to alternately and selectively join the gears 58 and 60 to the shaft section 62 and which includes a coupling 74, much in the nature of the device 46. Coupling 74 is slidable, but not rotatable, on the shaft section 62 and may be brought into engagement with either gear 58 or 60 by a control arrangement not shown, and disposed for accessibility to the operator of the vehicle. A power take-off shaft 76 may be mounted on the housing section 26 and be rendered operable in any suitable manner by shifting a gear 78 thereon into mesh with a gear 80 on the differential 68.

As in the case of the sprocket wheels 34, 36, 38 and 40, the diameters of the gears 58, 60, 70 and 72 may be chosen to suit the desires of the manufacturer to provide a speed differential, depending upon which of the gears 58 or 60 is operably coupled with the shaft section 62 and therefore, the shaft 30, through manipulation of the clutch coupling 74.

The details of construction of the differential 68 have not been shown since this unit per se forms no part of the present invention and may either be purchased upon the open market where same are available under the trademark "No-Spin" or designed in accordance with general principles of operation of equipment of this type to suit the needs of the present transmission assembly. It may be pointed out however, that through provision of such third differential in the transmission between the front and rear differentials of the vehicle, wrap-up is prevented by compensation for the different distances of travel of the front and rear wheels by virtue of the fact that a straight line of travel is not always followed, and such difference is quite substantial particularly on curves.

Furthermore, through the provision of differential 68, all of the power of the prime mover 12, through the structure 32 and the apparatus 52, is directed to the wheels of the vehicle having the greatest amount of traction and there is no power lost at any time notwithstanding the fact that one or more of the wheels may be spinning because of lack of traction.

The shafts 48 and 50 are in opposed, aligned relationship, with the shaft 48 in parallelism with the shaft 30 and therebelow and in perpendicular alignment with the axle 10. By such arrangement, the advantages hereinabove set forth are produced and, while details of construction may be varied, it is desired to be limited only by the spirit of the invention as defined by the scope of the appended claims.

Having thus described the invention what is claimed as new and desired to be secured by Letters Patent is:

1. In a motor vehicle, a front wheel and axle assembly; a rear wheel and axle assembly; a prime mover overlying the front axle; a horizontal drive shaft extending forwardly from the prime mover and having means for operably connecting the same thereto; a driven shaft between the prime mover and said front axle, and beneath the drive shaft in parallelism therewith; structure for operably interconnecting said shafts; an input shaft beneath the driven shaft, in parallelism therewith, behind the front axle, and perpendicular to the latter; means operably joining the input shaft and said front axle; apparatus for operably interconnecting the input shaft and the driven shaft; and a shaft for said rear wheel and axle assembly operably connected with said apparatus.

2. In the invention as set forth in claim 1 wherein said apparatus includes a number of mechanisms adapted for imparting variable speeds to the input shaft, and a clutching arrangement for selectively attaching any one of said mechanisms to the driven shaft.

3. In the invention as set forth in claim 2 wherein each mechanism is provided with a rotatable part having means of connection with the input shaft, and a member for each part respectively, operably engaging the same, and rotatable on the driven shaft.

4. In the invention as set forth in claim 3 wherein said clutching arrangement includes a coupling mounted on the driven shaft for rotation therewith and slidable thereon into engagement with any selected member on the driven shaft.

5. In the invention as set forth in claim 1 wherein said structure includes a number of units adapted for imparting variable speeds to the driven shaft, and clutch means for selectively joining any one of said units to the driven shaft.

6. In the invention as set forth in claim 5 wherein said apparatus includes a number of mechanisms adapted for imparting variable speeds to the input shaft, and a clutching arrangement for selectively attaching any one of said mechanisms to the driven shaft.

7. In the invention as set forth in claim 5 wherein each unit includes a rotatable element rigid to the drive shaft, an element rotatable on the driven shaft, and a continuous flexible band joining the elements.

8. In the invention as set forth in claim 7 wherein each mechanism is provided with a rotatable part having means of connection with the input shaft, and a member for each part respectively, operably engaging the same, and rotatable on the driven shaft.

9. In the invention as set forth in claim 7 wherein said clutch means includes a device mounted on the driven shaft for rotation therewith and slidable thereon into engagement with any selected element on the driven shaft.

10. In the invention as set forth in claim 9 wherein said clutching arrangement includes a coupling mounted on the driven shaft for rotation therewith and slidable thereon into engagement with any selected member on the driven shaft.

References Cited in the file of this patent

UNITED STATES PATENTS

| | | |
|---|---|---|
| 885,505 | McComb | Apr. 21, 1908 |
| 1,393,439 | Neuteboom | Oct. 4, 1921 |
| 1,623,214 | Storey | Apr. 5, 1927 |
| 2,078,034 | Smith | Apr. 20, 1937 |
| 2,306,545 | Kummich | Dec. 29, 1942 |
| 2,589,844 | Moore | Mar. 18, 1952 |